UNITED STATES PATENT OFFICE.

WILLIAM PFITZINGER, OF ELBERFELD, GERMANY, ASSIGNOR TO THE FARBENFABRIKEN, VORMALS FR. BAYER & CO., OF SAME PLACE.

SUBSTANTIVE YELLOW DYE.

SPECIFICATION forming part of Letters Patent No. 428,629, dated May 27, 1890.

Application filed September 12, 1889. Serial No. 323,764. (Specimens.) Patented in France June 7, 1889, No. 198,786.

*To all whom it may concern:*

Be it known that I, WILLIAM PFITZINGER, chemist, a subject of the Emperor of Germany, residing at Elberfeld, Prussia, Germany, have invented certain new and useful Improvements in the Manufacture of New Yellow Direct-Dyeing Coloring-Matters, (for which I have obtained Letters Patent in France, dated June 7, 1889, No. 198,786;) and I do hereby declare the following to be a full, clear, and exact description of the invention, such as will enable others skilled in the art to which it appertains to make and use the same.

The invention relates to the manufacture of substantive or direct-dyeing coloring-matter or dyes, and has for its object to produce such dyes from those thio derivatives of paratoluidine, metaxylidine, and pseudo cumidine that are obtained by melting these bases with sulphur until the evolution of hydrogen sulphide ceases, those thio derivatives derived from paratoluidine having been described by Gattermann Jacobsen, Ber. XXII, p. 330-442.

I have discovered that new dye-stuffs are formed by the diazo compounds of the thio bases referred to when combined with their sulpho-acids or by combining the diazo compounds of the sulpho-acids with the free bases themselves or the sulpho-acids of said free bases. All these dye-stuffs or coloring-matters have the property of dyeing unmordanted cotton in an alkaline bath. The best results are obtained with dye-stuffs derived from the thioparatoluidines. They dye cotton a fine greenish yellow, while those dye-stuffs derived from the thio derivatives or products of metaxylidine and pseudo cumidine impart a more reddish-yellow color to cotton.

In carrying out my invention I proceed in general as follows: First, the diazo compounds of the thio derivatives referred to are combined with an acetic-acid solution of the sulpho-acids of said thio bases; secondly, the diazo compounds of the sulpho-acids are combined with an acetic-acid solution of the said thio bases or their sulpho-acids, and, lastly, the thio bases are combined with thio bases or their sulpho-acids in solution in acetic acid. The resulting mixtures are allowed to stand for some days at a temperature of from 20° to 30° centigrade, and are thereafter slowly heated to 60° or 80° centigrade until a sample dissolves in alkaline water. The dye-stuffs are then heated to boiling, neutralized with sodium carbonate, and the dye-stuffs separated in a well-known manner by means of common salt and dried.

Having described the process as generally carried out, I will now describe it more specifically, to wit:

Dye-stuffs from the thioparatoluidine, melting at 191° centigrade, and the sulpho-acid thereof I diazotize with a solution of ten kilograms of sodium nitrite at a temperature of from 30° to 40° centigrade, thirty-one kilograms of thioparatoluidine sulphate, called "dehydrothioparatoluidine" by Jacobsen and melting at 191° centigrade. The diazo compound obtained is poured into an acetic-acid solution of twenty-five kilograms of thioparatoluidine sulpho-acid, which can be obtained by sulphonating the thioparatoluidine at 191° centigrade. A deep black precipitate is formed under continuous stirring, and the temperature is then raised to from 20° to 30° centigrade, and the mixture left standing for about two days at a temperature of from 60° to 80° centigrade, when the black precipitate will turn to a clear orange shade. If it dissolves with a fine yellow color when boiled in alkaline water, the mixture is heated to boiling, neutralized with sodium carbonate, treated with common salt, and the precipitate filtered off and dried. The resulting dye-stuff dyes cotton a fine greenish-yellow shade.

*Dye-stuff from thioparatoluidine sulpho-acids.*—If thioparatoluidine, which melts at 191° centigrade, is sulphonated, a sulpho-acid is obtained that can readily be diazotized and then caused to react on thioparatoluidine sulpho-acid and a beautiful green-yellow dye-stuff obtained. In this case I proceed as follows: The diazo compound of thirty-five kilos of thioparatoluidine sulpho-acid is poured into an acetic-acid solution of twenty-five kilos of a like thioparatoluidine sulpho-acid, and the mixture is treated exactly as described in reference to the first example hereinabove given.

Other thio derivatives than dehydrothioparatoluidine or its sulpho-acids may be used and similar results obtained—as, for instance, the thio derivatives of paratoluidine, called "primulin base" or "primuline," or those thio products which have as yet not been exactly defined or described, as the thio products of metaxylidine or pseudo cumidine obtained by heating the bases with sulphur.

Having described my invention I claim—

1. The process for manufacturing direct yellow dyeing coloring-matters deriving from the thio derivatives of paratoluidine, metaxylidine, and pseudo cumidine, which consists in combining the diazo compounds of the thio derivatives of paratoluidine, metaxylidine, and pseudo cumidine or those of their sulpho-acids with the sulpho-acids of the thio derivatives of paratoluidine, metaxylidine, and pseudo cumidine, substantially as described.

2. The process for manufacturing direct yellow dyeing coloring-matters, deriving from the thio derivatives of paratoluidine, metaxylidine, and pseudo cumidine, which consists in combining the diazo compounds of the sulpho-acids of the thio derivatives of paratoluidine, metaxylidine, and pseudo cumidine with the thio derivatives of paratoluidine, metaxylidine, and pseudo cumidine, substantially as described.

In testimony whereof I affix my signature in presence of two witnesses.

WILLIAM PFITZINGER.

Witnesses:
ANTON KEUTER,
JAMES M. KESSEN.